Patented June 18, 1946

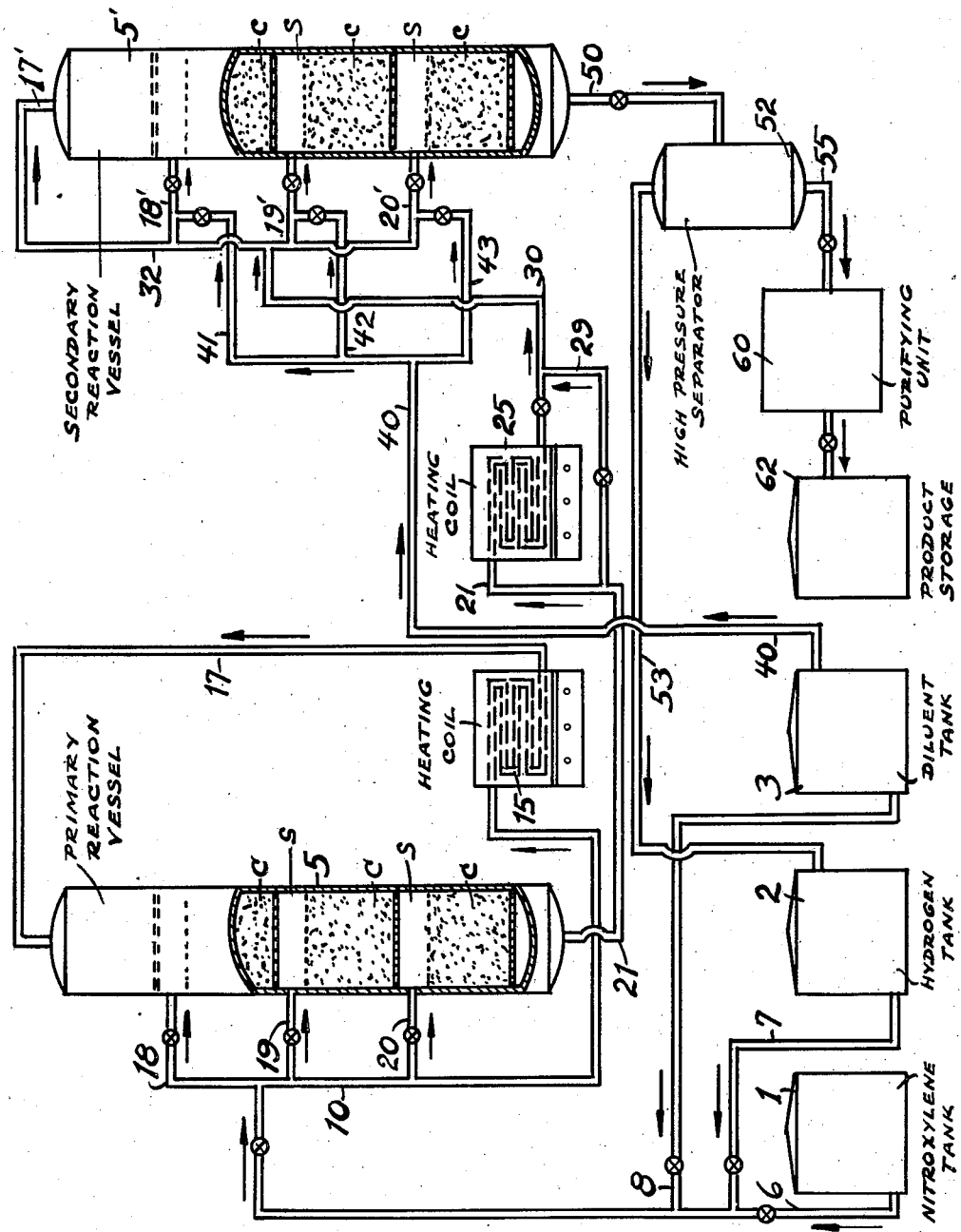

2,402,423

UNITED STATES PATENT OFFICE 2,402,423

REDUCTION OF AROMATIC NITRO COMPOUNDS

Ralph Burgess Mason, Baton Rouge, La., assignor to Standard Oil Development Company, a corporation of Delaware Application October 28, 1943, Serial No. 508,066

10 Claims. (Cl. 260—580)

The present invention relates to improvements in the art of reducing aromatic nitro compounds to the corresponding amine, and more particularly, it relates to the reduction of commercial nitroxylenes which contain substantial quantities of di-nitroxylenes, admixed with mono-nitroxylenes.

Recently, it has been discovered that nitro aromatics, such as, for example, xylidines, greatly improve the performance of aviation gasoline, particularly its rich mixture performance under high compression conditions.

In brief, my invention resides, as indicated, in the process of producing aromatic amines by reduction of the corresponding aromatic nitro compound and in its essence, involves subjecting the commercial nitro compound to two-stage reduction. In the first stage, I process the di-nitro derivatives by reducing them under mild conditions, i. e., where the temperatures do not exceed 350° F. during the di-nitro aromatic reduction, and in the second stage, the mono-nitro aromatic is reduced at somewhat higher temperatures without danger of causing explosions, product degradation or otherwise permitting the reaction to get out of hand. The chemist will appreciate that when a nitro aromatic is reduced to the corresponding amine, large quantities of heat are evolved. (Approximately 240,000 B. t. u. heat per pound mol when the mono-nitro aromatic is reduced to the corresponding amine.) It is obvious that in the case of poly-nitro aromatics, the heat released is much greater.

The main object of my present invention is to provide means for carrying out the production of commercial nitro aromatics containing appreciable quantities of poly-nitro aromatics in a safe and expeditious manner.

Another object of my invention is to reduce aromatic nitro compounds under conditions such that the benzene ring is not hydrogenated.

Other and further objects of my invention will appear from the following description and claims.

In the accompanying drawing, I have shown diagrammatically an apparatus layout in which a preferred modification of my invention may be carried into practical effect.

I shall now describe the process of producing commercial nitroxylenes containing 5 to 8 volume per cent of di- and tri-nitroxylenes, and in describing the process, I shall refer to the accompanying drawing. 1 represents the storage drum for commercial mono-nitroxylenes containing, as usual, some poly-nitroxylenes. 2 represents a hydrogen storage vessel, and 3 represents a container for a diluent employed to temper the reaction by absorbing at least a portion of the heat released during the reaction. A good diluent or coolant is water. Also, in the drawing, 5 represents a primary reaction zone, the reaction vessel containing a catalyst C disposed in the reactor in separated portions, as indicated with spaces S therebetween. Catalysts which are satisfactory include sixth group of the periodic system metal sulfides, such as molybdenum sulfide supported on charcoal, or any of a number of hydrogenation catalysts on various supports. The hydrogenation catalyst is preferably, however, one which is not affected by sulfur.

In the operation, nitroxylene is withdrawn from the storage 1 through a line 6; meanwhile hydrogen is withdrawn from storage 2 via line 7 and excess diluent is withdrawn from storage 3 via line 8. These materials are simultaneously discharged into a manifold 10 and thereafter into the reaction vessel 5 in the following manner: first, a portion of the mixture in manifold 10 is passed through a heating coil 15 where its temperature is raised sufficiently to initiate the reaction, say around 250° F., and then it is charged by 17 into the top of the reactor 5. Simultaneously, unheated portions of the mixture of hydrogen, nitroxylenes and water are injected at separate points into the spaces S of the reactor through lines 18, 19 and 20. According to my process, a good way to operate is to charge, say, about 20% of the feed to the reactor through line 17 and the remainder is charged through lines 18, 19 and 20 in the various points indicated in about equal proportions. The diluent, whether it be water or some other liquid, should be present in sufficient quantities to prevent a temperature rise within the reactor 5 above 350° F. However, I prefer to operate in this reactor 5 at temperatures within the range of from 100° to 300° F. The pressure prevailing in reactor 5 may be of the order of 3000 pounds/sq. in.

Under the conditions stated, the di-nitro and tri-nitroxylenes are reduced to the corresponding polyamines, and a portion, say 25% of the mono-nitroxylene is also reduced in reactor 5. Of course, sufficient hydrogen is present to provide substantial excess over that theoretically required to reduce all of the nitroxylenes present. The temperatures are maintained at a low level so that when operating at a feed rate of about 0.4 volume of nitroxylene per volume of catalyst per hour and a feed rate of water of the order 1.6 volumes of liquid water per volume of catalyst per hour, the reaction temperature does not exceed the stated maximum. The reaction products are withdrawn through line 21, may be then discharged into heating coil 25 where the temperature is increased to, say, 350° F., thereafter passed via line 30 into manifold 32 and thence into a second reactor 5' through lines 17', 18', 19' and 20'. If desired, the product in line 21 may be bypassed first around heater 25 through line 29 or a part of the material may be so bypassed. Furthermore, if desired, water or other diluent may be withdrawn from storage 3 by way of line 40 and discharged via lines 41 and/or 42, and/or 43 into any or all of the inlet lines 18', 19', or 20', in order to control the temperature in reactor 5' at these points if that is necessary.

It is to be understood that the temperature prevailing in reactor 5' may be much higher than in reactor 5. For example, the temperature in reactor 5' may be as high as 550° F. without danger of runaway temperatures, explosions, degradation or other unfavorable conditions. The feed rate of nitroxylenes through reactor 5' together with diluent water is the same as the feed to reactor 5. A similar hydrogen pressure of about 3,000 lbs./sq. in. is maintained in reactor 5'. Under the conditions stated, the mono-nitroxylenes unconverted in reactor 5 are converted in reactor 5' and the reaction products are withdrawn from line 50, are discharged into high pressure separator 52 where the hydrogen is separated and withdrawn via line 53 and recycled to hydrogen storage drum 2. The water and xylidines are withdrawn from hydrogen separator 52 via line 55 and thence discharged to purifying equipment 60 to separate the product from the water and thereafter the product is collected in product storage 62. For purposes of simplicity, I have not described in detail the method of separating the xylidines from water formed in the reaction and added, for purification of the product does not go to the heart of my invention. It will also be obvious to engineers that numerous expedients, such as heat exchangers, pumps, flow control, and other devices which have been omitted from the drawing and the description may be employed in known manner. It is to be understood, however, that such conventional equipment is intended to be included by implication in my description of the drawing.

While I have disclosed merely the reduction of nitroxylenes, it is obvious that my process is applicable to the reduction of commercial mononitrobenzene associated with di- and tri-nitro, the poly-nitro compounds being present in substantial quantities, say up to 8% or more. Instead of using molybdenum sulfide on charcoal as a catlyst, I may use in either stage any hydrogenation catalyst, such as the oxides or sulfides of second, fourth, fifth and sixth group of the Periodic System. Instead of using activated carbon or charcoal as a support for the active catalyst, I may use other supports, such as clay, activated alumina, silica gel, etc. Also, in the second stage of my process it is pointed out that the temperature range is controlled responsive to the activity of the catalysts. The temperature should be maintained low enough to prevent hydrogenation of the aromatic nucleus. Thus, if a catalyst, such as metallic nickel, is used, the temperature range in reactor 5' should be from 200° to 400° F. With less active hydrogenation catalyst, such as a mixture of nickel and tungsten sulfides, the temperature should be of the order of 300° to 575° F. Further, although I have described in detail a two-stage reduction of the aromatic amines, I may use three or more stages, but generally a two-stage operation is sufficient to maintain control of the reaction which is one of the main purposes of my invention, where as here the goal is to secure maximum yields in the shortest time. The reaction may be conducted in such a manner that the aromatic amines coming from the secondary reaction vessel correspond in yield to over 99% conversion of the nitro aromatics charged to the primary reaction vessel. The best processes are, of course, the continuous operations which, until recently, had not been developed. The prior technique, in which the amines were produced in batch operations, were too slow and cumbersome to meet present day tremendous requirements for aromatic amines which are used as a necessary additive in the manufacture of aviation gasoline.

What I claim is:

1. In the continuous catalytic reduction of aromatic nitro compounds to the corresponding amine, the improvement which comprises subjecting a commercial nitro aromatic containing poly-nitro compounds to a first stage of reduction maintained under relatively mild temperature conditions whereby the poly-nitro compounds are reduced and thereafter subjecting the mono-nitro derivatives to a second reduction operation at a temperature substantially higher than that in the first stage.

2. The method set forth in claim 1 in which the nitro aromatics reduced are commercial nitroxylenes.

3. The method set forth in claim 1 in which the temperature in the first stage does not exceed 350° F. and in the second stage does not exceed 600° F.

4. The method of forming aromatic amines from the corresponding commercial nitro aromatic compound which comprises subjecting the nitro aromatic compound to reducing conditions in a first stage at relatively low temperatures and completing the reduction in a subsequent stage at higher temperatures.

5. The method of claim 4 in which the temperature in the first stage is of the order of 100° F.

6. The method specified in claim 4 in which metallic nickel is employed to catalyze the reduction.

7. A method of safely and expeditiously causing the catalytic reduction of commercial nitro aromatics containing poly-nitro derivatives of said aromatics which comprises performing the reduction in stages in separated reaction zones, the temperature in the first zone being maintained within the range of from 100 to 300° F. and that in the last zone being at a level higher than that in the first zone.

8. The method of claim 7 in which the catalyst is molybdenum sulfide supported on charcoal.

9. The method of claim 7 performed continuously.

10. In the continuous production of aromatic amines by hydrogenation of commercial mononitro aromatics containing poly-nitro aromatics, the improvement comprising continuously feeding the nitro aromatic to a primary reaction zone containing a catalyst and maintained at temperatures below about 300° F. whereby the poly derivatives are continuously reduced, withdrawing the reaction products, continuously feeding said reaction products to a second reaction zone containing a catalyst and maintained at a higher temperature than said first zone and continuously withdrawing aromatic amines from said second zone corresponding in yield to over 99% conversion of the nitro aromatics charged to the first-named reaction.

RALPH BURGESS MASON.